Dec. 14, 1943.　　　　L. R. MUSKAT　　　　2,336,561
CONVEYER OF THE VIBRATORY TYPE
Filed Nov. 2, 1940

Witness:
E. Camporini

Inventor:
Louis R. Muskat,
By Arthur M. Nelson
Attorney.

Patented Dec. 14, 1943

2,336,561

UNITED STATES PATENT OFFICE 2,336,561

CONVEYER OF THE VIBRATORY TYPE

Louis R. Muskat, Oak Park, Ill., assignor, by mesne assignments, to L. R. Muskat, Peter Muskat, Delbert Muskat, Nina L. Muskat, and Edna C. Muskat, collectively, doing business as Triangle Package Machinery Co., Chicago, Ill.

Application November 2, 1940, Serial No. 363,973

5 Claims. (Cl. 198—220)

This invention relates to improvements in conveyors of the vibratory type, i. e. of the type in which material is advanced along the conveyor from the receiving end to the discharge end by virtue of the vibratory action of the conveyer.

For certain purposes it is desirable to be able to discharge the material from the conveyer in a very fine stream or possibly as single separated pieces or particles.

The general object of the invention is to provide a conveyer whereby this advantageous result can be accomplished. Other objects of the invention will appear from the detailed description of the specific mechanism illustrated.

In order to attain the stated object, means are interposed between the material receiving portion and the material discharge portion of the vibratory conveyor to resist the advancement of material along the conveyer. This is in the nature of a barrier. The action of the barrier is to cause the material passing over the same onto the discharge portion to move along the discharge portion at a speed greater than the speed at which the material moves along the receiving portion. Because of this fact, the particles or pieces on the discharge portion are spaced relatively further apart and therefore leave the conveyer more widely separated, or, if desired, as individual separated particles or pieces.

Vibratory conveyers are sometimes used for moving materials of kinds which do not readily separate. The present invention seeks as one of its objects to provide means assisting in the separation of the particles. This is also accomplished by the barrier as constructed because as the particles flow over the top of the barrier, they drop through space to the bottom of the conveyer and in this dropping action some separation or detachment of one particle from the other is caused.

Another general feature of the invention resides in the simplified mechanism for actuating the conveyer to impart the desired type of vibratory movement. For this purpose, the conveyer trough is mounted upon a spring member arranged at an acute angle so that when actuated by the vibratory motor, a considerable upward throw is given to the conveyer trough in its reciprocatory movement. This results in tossing or popping the particles or pieces of material in the conveyer, further assisting in the separating action.

The above mentioned objects of the invention, as well as others, together with the advantages thereof, will more fully appear as the specification proceeds.

Figure 1:
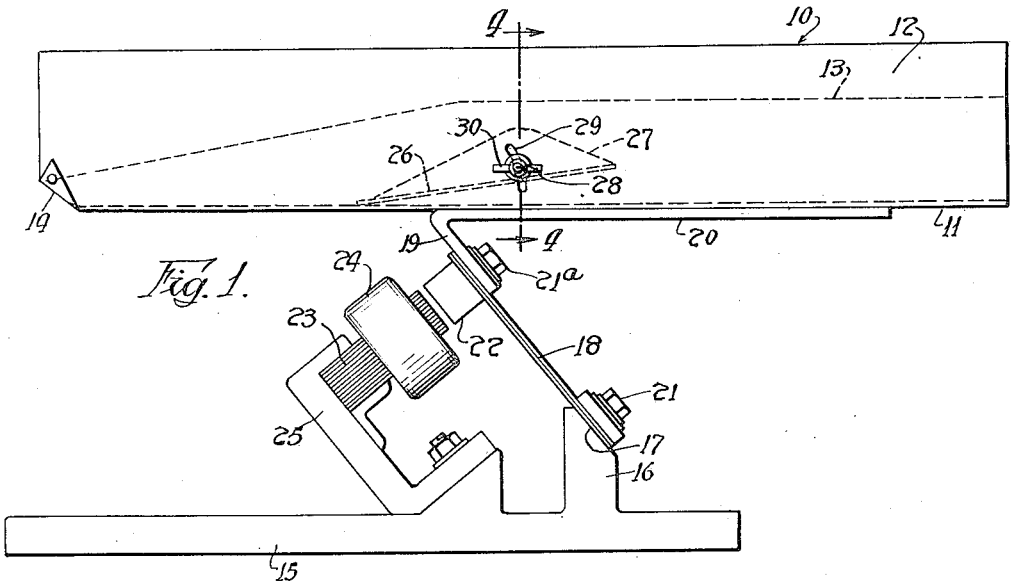
Fig. 1 is a view in side elevation of a vibratory conveying mechanism, embodying the preferred form of the invention.
Figure 2:
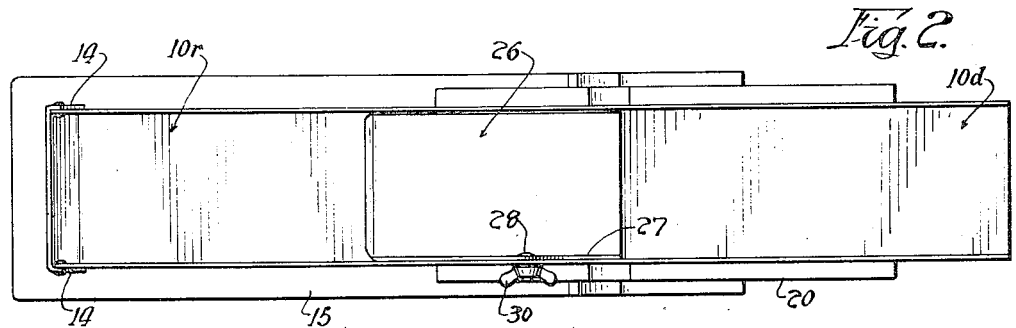
Fig. 2 is a top plan view thereof.

Referring now in detail to that embodiment of the invention illustrated in the drawing, 10 indicates as a whole the conveyer of the mechanism which has the form of a trough or tray that is open at its top and front end and is partly closed at its rear end. As herein shown, said conveyer includes a flat straight bottom wall 11 and upright side walls 12 and 13 respectively, a part 14 of the bottom wall being turned upwardly at the rear end to partially close said end as before mentioned.

The conveyer 10 is disposed at an elevation above a base 15 and is operatively connected thereto as follows: The base 15 is provided toward its front end with an upright boss 16 having the upper front portion thereof cut away to provide an upwardly and rearwardly inclined face 17. The angle of inclination of this face is substantially 45°.

Figure 3:
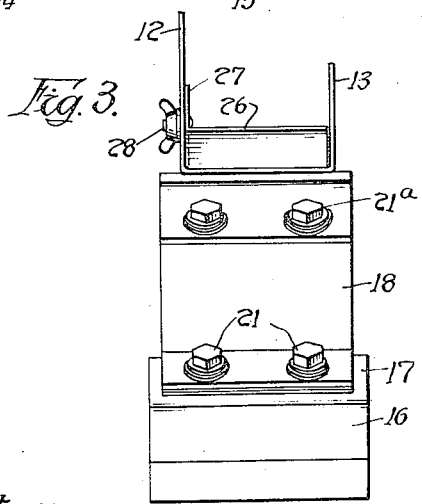
Fig. 3 is a view in end elevation of the mechanism appearing in Fig. 1 as viewed from the right hand end thereof.
Figure 4:
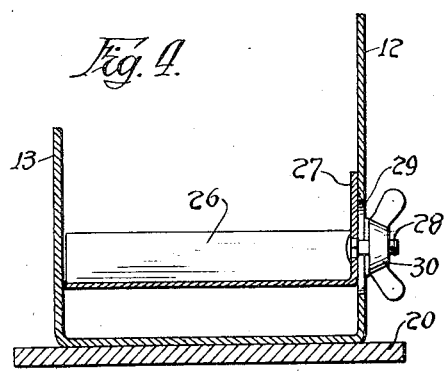
Fig. 4 is a transverse vertical detail sectional view through a part of the improved mechanism on an enlarged scale as taken on the line 4—4 of Fig. 1.

A deflectable member 18 is fixed at its bottom end to the face 17 of the boss 16 by means of suitable screws 21, as best appears in Figs. 1 and 3. This member is herein shown as a laminated leaf spring and in its normal unstressed or undeflected condition is straight and therefore its angle of inclination is normally that of said face 17. The member 18 is disposed about midway between the ends of the conveyer member 10 and the front surface of the upper end thereof is fixed to the downwardly and forwardly extending portion 19 of a strap 20 by means of screws 21ª. The strap 20, which extends toward the front end of the conveyer is attached in any suitable manner to the underside of the conveyer bottom 11.

An armature member 22 is fixed to the rear side of the upper end of the member 18 as by the screws 21ª before mentioned.

The armature 22 is disposed in operative relation with respect to the core 23 of an electromagnet 24 and which is supported from the base by a bracket or clip 25. The electromagnet is one adapted for use with alternating current. When the magnet is energized by the series of electrical impulses of such a current, in the changes of its direction of flow, each impulse will cause the core 23 to attract the armature 22 and deflect the member 18 thus storing energy therein. Between each impulse, the energy stored in the member 18 is released. The vibrations thus produced are transmitted to the conveyer because the member 18 is the sole support therefor.

By reason of the angle of inclination of the member 18 as before mentioned, it is apparent that the vibrations thereof impart vibrations to the conveyer in a short arcuate path. Thus the particles of the material deposited upon the material receiving action 10r of the conveyer by any suitable means, are impelled or moved forwardly with a short leaping or popping action. Such an action has a definite tendency to separate pieces of such products as potato chips, noodles, wrapped candy pieces and the like which normally are difficult to separate.

In connection with this particular movement, imparted to the particles of material operated upon for a separating action, this action is further increased by the following structure: At some point along the conveyer I provide barrier means over which the particles of material operated upon must move and which means holds back and slows up the movement of the pieces of material to the rear thereof. Therefore, the speed of such particles in advance of the barrier i. e. in the material discharge portion 10d of the conveyer, is relatively greater than that of the particles at the rear of the barrier i. e. in the material receiving portion 10r of the conveyer. Where the particles are of substantial size, such as candy pieces, cookies, potato chips and the like, the particles may be so separated that they move forward as single pieces.

As shown herein, said barrier means comprises a relatively thin metal plate 26 having a width sufficient to span the space between the side walls 12 and 13 of the conveyer. At one side it is provided with an upright flange 27 in which is anchored a screw 28. When this plate is in one of its positions in the conveyer, its rear edge is engaged on the bottom 11 of the conveyer and its front end is spaced above said bottom so that said plate is inclined upwardly and forwardly to act as a ramp. The bolt or screw 28 extends through an arcuate slot 29 (see Fig. 1) in the associated side wall of the conveyer and receives a butterfly nut 30 whereby the plate may be locked in that position into which it has been adjusted.

The plate 26 therefore, acts as an adjustable restriction or barrier over which the particles of material operated on, move during vibration of the conveyer. As said particles of material at the rear of said plate are held back thereby, it is apparent that those that have cleared or passed over said plate, so as to be in front thereof, have a movement that is relatively faster than the movement of the particles to the rear of said plate. As said particles clear the front end of the plate, they drop through space as they return to the bottom of the conveyer. Said drop also assists in separating the particles.

The particles in front of said plate on the discharge portion 10d thin out to a depth less than that at the rear of said plate. The thinning out and more rapid movement of said particles loosens and separates them to better advantage so that they may be discharged off the discharge portion of the conveyer almost singly if desired.

By reason of the efficient action of the mechanism described, the same separating action is afforded in one mechanism, as has heretofore required two or more mechanisms.

With the improved construction described, a simple and inexpensive mechanism is provided with more efficiency in operation than in mechanism heretofore available for similar purposes.

While in describing the invention I have referred in detail to the form, construction and arrangement of the parts involved, the same is to be considered only in the illustrative sense so that I do not wish to be limited thereto except as may be specifically set forth in the appended claims.

I claim as my invention:

1. In a mechanism of the kind described, the combination of a trough like conveyer member mounted for vibratory movement, and means extending from side to side of said member and having an edge portion engaged with and overlying the bottom of said conveyer member and inclined upwardly and forwardly therefrom and over which the pieces of material operated upon must climb so as to be thinned out thereby in their movement along said conveyer member.

2. A conveyer of the vibratory type embodying therein a trough having a bottom and sides and including a material receiving portion and a material discharge portion, and means intermediate said portions providing one edge extending between the sides of the trough adjacent to and overlying the bottom of the trough at the material receiving portion and an opposite edge extending between the sides of the trough and disposed at an elevation above the bottom of said trough at said material discharge portion and which means resists the movement of the material in the vibration thereof and over which edge said material must pass for a free drop and a thinning out upon a part of said discharge portion so as to there move at a speed greater than that of the material on said receiving portion in the vibration of said trough.

3. A conveyer of the vibratory type embodying therein a trough having a bottom and sides and including a material receiving portion and a material discharge portion, a barrier intermediate said portions and extending between the sides of the trough and providing a surface inclined upwardly and forwardly in the direction of the movement of the material in the vibration of said trough, the forward end of said barrier providing an edge spaced above the bottom of the trough and the rearward end of said barrier providing an edge adjacent to and overlying the bottom of the trough, said surface resisting the movement of said material and over which edge said material must pass for a free drop and a thinning out upon a part of said discharge portion so as to there move at a speed greater than that of the material on said receiving portion in the vibration of the trough.

4. A conveyer of the vibratory type embodying therein a trough having a bottom and sides and including a material receiving portion and a material discharge portion, and means intermediate said portions providing an edge extending between the sides of the trough and disposed at an elevation above the bottom of said trough and which means resists the movement of the material in the vibration thereof and over which edge said material must pass for a free drop and a thinning out upon a part of said discharge portion so as to there move at a speed greater than that of the material on said receiving portion in said vibration of said trough, and means coacting with a part of said trough and said first mentioned means and operable to dispose said edge at different elevations with respect to the bottom of said trough.

5. A conveyer of the vibratory type embodying therein a trough having a bottom and sides and including a material receiving portion and a material discharge portion, means providing a surface intermediate said portions and which surface extends between said sides and inclines upwardly and forwardly in the direction of the movement of the material along the trough in the vibration thereof, one end edge of said means disposed adjacent to and overlying the bottom of said trough in proximity to the material receiving portion and the other end edge of said means being spaced above and extending across a part of said discharge portion so as to overhang the same, said surface resisting the movement of the material thereover and which material has substantially a free drop and is thinned out as it passes over said other end edge onto said discharge portion and whereby the thinned out material on said discharge portion is caused to move at a speed greater than that of the material on said receiving portion, in the vibration of the trough.

LOUIS R. MUSKAT.